No. 804,515. PATENTED NOV. 14, 1905.
P. ASKENASY & M. MUGDAN.
PROCESS OF MAKING AND SEPARATING HYDROCHLORIC
AND SULFURIC ACIDS.
APPLICATION FILED JUNE 22, 1903.
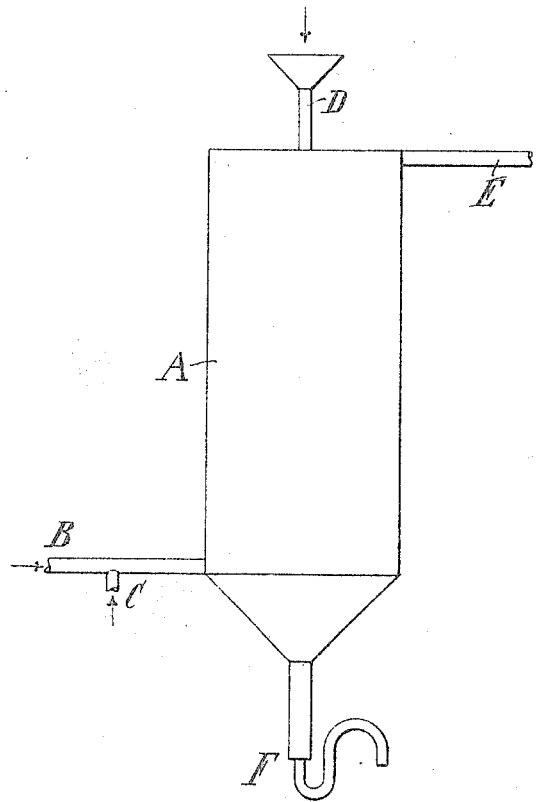
Witnesses:
Inventors:
Paul Askenasy
Martin Mugdan
By Eustace W. Hopkins
Atty

UNITED STATES PATENT OFFICE.

PAUL ASKENASY AND MARTIN MUGDAN, OF NUREMBERG, GERMANY.

PROCESS OF MAKING AND SEPARATING HYDROCHLORIC AND SULFURIC ACIDS.

No. 804,515.  Specification of Letters Patent.  Patented Nov. 14, 1905.

Application filed June 22, 1903. Serial No. 162,671.

*To all whom it may concern:*

Be it known that we, PAUL ASKENASY and MARTIN MUGDAN, subjects of the German Emperor, residing at Nuremberg, Germany, have invented a new and Improved Process of Producing and Separating Hydrochloric and Sulfuric Acids, of which the following is a description.

It is known that the reaction of chlorin and sulfurous acid in water results in the formation of hydrochloric and sulfuric acids. By means of this reaction it was hitherto only possible to obtain a mixture of sulfuric acid and hydrochloric acid, (Deacon's British Patent No. 3,098, 1898,) from which the separation had to be carried out by expensive and protracted operations, such as distillation and the like. Under these circumstances the formation of hydrochloric and sulfuric acids, according to the said reaction, could hardly be used for technical purposes, because the obtained mixture of both acids was only directly available to a very limited extent. In order that the reaction could be used for technical purposes, the separation of hydrochloric and sulfuric acids had to be carried out easily. We therefore set ourselves the task to effect the separation of hydrochloric and sulfuric acids during their formation in the process itself. It was observed that chlorin and sulfurous acid act upon concentrated hydrochloric acid and also strong sulfuric acid, but very slowly upon the latter, and that by using this acid hydrochloric acid and sulfuric acid are again formed. The hydrochloric acid thus displaced by the sulfuric acid escapes, together with the newly-formed hydrochloric acid, in the form of gas, because it is no longer soluble in the sulfuric acid which is becoming concentrated and in the hydrochloric acid enriched with sulfuric acid.

In order to render the present specification easily intelligible, reference is had to the accompanying drawing, which shows a diagram of the reaction-chamber.

The production and separation of hydrochloric acid and sulfuric acid by utilizing the reaction stated by Deacon and the facts ascertained are carried out in the following manner: In a suitable chamber or tower A, which is preferably filled with stones and in which pure or diluted sulfurous acid (pyritic gases) are introduced at B and chlorin at C at the bottom, only so much water is introduced from above at D as corresponds with the quantity of gaseous hydrochloric acid and concentrated (sixty-five to eighty per cent.) sulfuric acid produced. The reaction continues until the remainder of the gases is consumed, when the reaction substances are allowed to act upon each other for a sufficient length of time, which can be attained by varying the proportions of the reaction-chamber according to requirement. At the commencement of the process a violent reaction takes place at the point where the gases come into contact with the current of liquid, which produces a mixture of aqueous hydrochloric acid and sulfuric acid. This mixture sinks in the reaction-chamber and comes into contact with fresh quantities of the gas mixture, thus forming fresh quantities of acid until finally a saturated solution of hydrochloric and sulfuric acid is formed. As soon as this point has been attained the sulfuric acid then formed by the continued reaction of the gas and liquid drives off the hydrochloric acid from the acid mixture in such a manner that sulfuric acid becoming more concentrated and poorer in hydrochloric acid sinks to the bottom and may be carried off in an entirely pure state at F, while the hydrochloric acid completely escapes at the top in the form of gas. This hydrochloric acid will not be absorbed, because during its passage up to a certain height of the tower it will only come into contact with mixtures which are saturated with hydrochloric acid.

Above the point at which the main reaction of the gas mixture and the liquid takes place only gaseous hydrochloric acid, steam, aqueous hydrochloric acid, and water, together with indifferent gases and possibly slight residues of uncombined gases, will be present when the water-supply is continuous. A part of the hydrochloric acid passing through this zone will be absorbed by the water, and thus again returned to the zone of reaction, while the remainder of the gaseous hydrochloric acid eventually mixed with steam and possibly slight residues of uncombined gases leaves the tower at the top at E in order to undergo further treatment in a suitable manner. The heat freed during the process assists in the separation of the acids from the acid mixture. This separation may be further facilitated by the introduction of hot pyritic gases, which also assist in concentrating the sulfuric acid.

Instead of water acid solutions, preferably a solution of hydrochloric acid in water, may be introduced into the reaction-tower. When water is employed, it comes into contact with gaseous hydrochloric acid in the upper part of the tower. An intensive generation of heat takes place. An almost undeterminable quantity of water is evaporated or carried away as vapor and the regular course of the reaction is disturbed. These drawbacks will be obviated when hydrochloric acid, preferably concentrated hydrochloric acid or a not too diluted sulfuric acid, or a mixture of both, is used instead of water.

In carrying out the process a want of uniformity of the gas-currents may easily lead to the sulfurous acid and chlorin passing into the apparatus for condensing the hydrochloric acid and causing a reaction there. This results in the formation of the sulfuric acid, which impurifies the hydrochloric acid. In order to obviate these disadvantages, it is advisable to employ chlorin in excess of the equivalent proportion of the gases. At first it might be assumed that the surplus of sulfurous acid could be used with the same result; but owing to the great tendency of sulfurous acid to dissolve in hydrochloric acid the said surplus would remain dissolved in the latter and become oxidized by air into sulfuric acid. These drawbacks are obviated by chlorin being employed in excess of the equivalent proportion of the sulfurous acid. In this case traces of free chlorin pass into the hydrochloric acid. In order to obviate this drawback, the free chlorin is absorbed by means which combine chlorin before the condensation of the hydrochloric acid in the gases is effected. Ferrous chlorid, sulfureted hydrogen, metallic sulfids, and the like have proved to be suitable for effecting the said absorption. Other chlorin-absorbing means, such as charcoal, may also be used.

It will be obvious that instead of a single reaction-chamber several may be used, arranged one behind the other.

We claim as our invention—

1. An improved process for simultaneously producing and separating hydrochloric and sulfuric acids on the counter-current principle, which consists in feeding sulfurous acid and chlorin, to one end of a reaction-chamber and introducing a reacting liquid at the opposite end, the proportion of the reacting liquid introduced being so measured or limited that on the one hand a strong sulfuric acid free from hydrochloric acid flows off while on the other hand a gaseous hydrochloric acid free from sulfuric acid escapes from the chamber substantially as described.

2. An improved process for simultaneously producing and separating hydrochloric and sulfuric acids on the counter-current principle, which consists in feeding sulfurous acid and chlorin, the latter in excess of the proportion of the reaction, to one end of a reaction-chamber and introducing a reacting liquid at the opposite end, the proportion of the reacting liquid introduced, being so measured or limited that on the one hand a strong sulfuric acid free from hydrochloric acid flows off while on the other hand a gaseous hydrochloric acid free from sulfuric acid escapes from the chamber substantially as described.

3. An improved process for simultaneously producing and separating hydrochloric and sulfuric acids on the counter-current principle, which consists in feeding sulfurous acid and chlorin, to one end of a reaction-chamber and introducing a solution of hydrochloric acid and water at the opposite end, the proportion of the reacting liquid introduced, being so measured or limited that on the one hand a strong sulfuric acid free from hydrochloric acid flows off while on the other hand a gaseous hydrochloric acid free from sulfuric acid escapes from the chamber substantially as described.

4. An improved process for simultaneously producing and separating hydrochloric and sulfuric acids on the counter-current principle, which consists in feeding sulfurous acid and chlorin, the latter in excess of the proportion of the reaction, to one end of a reaction-chamber and introducing a solution of hydrochloric acid and water at the opposite end, the proportion of the reacting liquid introduced being so measured or limited, that on the one hand a strong sulfuric acid free from hydrochloric acid flows off while on the other hand a gaseous hydrochloric acid free from sulfuric acid escapes from the chamber substantially as described.

In witness whereof we have hereunto set our hands in presence of two witnesses.

PAUL ASKENASY.
MARTIN MUGDAN.

Witnesses:
  EUGEN STRAUB,
  LUDWIG SCUNINGER.